(12) United States Patent
Huang et al.

(10) Patent No.: US 9,519,960 B2
(45) Date of Patent: Dec. 13, 2016

(54) METHOD FOR ESTIMATING A NUMBER OF OBJECTS

(71) Applicant: National Applied Research Laboratories, Taipei (TW)

(72) Inventors: Chung-I Huang, Taichung (TW);
Chien-Hao Tseng, Taichung (TW);
Fang-Pang Lin, Taichung (TW)

(73) Assignee: National Applied Research Laboratories, Taipei (TW)

( * ) Notice: Subject to any disclaimer, the term of this patent is extended or adjusted under 35 U.S.C. 154(b) by 0 days.

(21) Appl. No.: 14/739,182

(22) Filed: Jun. 15, 2015

(65) Prior Publication Data

US 2015/0371084 A1 Dec. 24, 2015

(30) Foreign Application Priority Data

Jun. 18, 2014 (TW) .............................. 103121044 A

(51) Int. Cl.
*G06K 9/46* (2006.01)
*G06T 5/30* (2006.01)
*G06T 7/00* (2006.01)

(52) U.S. Cl.
CPC ............ *G06T 5/30* (2013.01); *G06T 7/0081* (2013.01); *G06T 2207/30242* (2013.01)

(58) Field of Classification Search
CPC ................... B60H 1/248; G06T 2207/30242; G06T 5/30; G06T 7/0081
USPC ........................................................ 382/192
See application file for complete search history.

(56) References Cited

U.S. PATENT DOCUMENTS

2013/0028503 A1* 1/2013 Wakui .................. H05K 9/0086
382/141

FOREIGN PATENT DOCUMENTS

CN 101751603 A 6/2010

* cited by examiner

*Primary Examiner* — Manuchehr Rahmjoo
(74) *Attorney, Agent, or Firm* — Trop Pruner & Hu, P.C.

(57) ABSTRACT

A method for estimating a number of objects is to be implemented by a processing module, and is utilized to estimate a number of a plurality of objects having elongated shapes based on an image of the objects that contains substantially-circular end faces of the objects. The method includes steps of generating a characteristic image based on the image of the objects, the characteristic image containing a plurality of characteristic patterns which are associated with the end faces of the objects, calculating a number of the characteristic patterns based on the characteristic image, and obtaining an estimated number of the objects based on at least the number of the characteristic patterns thus calculated.

9 Claims, 5 Drawing Sheets

900

METHOD FOR ESTIMATING A NUMBER OF OBJECTS

CROSS-REFERENCE TO RELATED APPLICATION

This application claims priority of Taiwanese Patent Application No. 103121044, filed on Jun. 18, 2014.

FIELD

The disclosure relates to a method for estimating a number of objects, more particularly to a method utilized to estimate a number of a plurality of objects having elongated shapes based on an image of the objects that contains substantially-circular end faces of the objects.

BACKGROUND

Currently, there are two approaches for estimating a number of objects, such as reinforcement steel bars. The first approach is to count the objects one by one by way of manual counting. Drawbacks to the first approach are that considerable labor cost may be incurred, and that counting errors are more likely to be made when there is a huge quantity of the objects. Moreover, manual counting is very time-consuming.

The second approach is counting by weighing, in which a single one of the objects and the whole batch of the objects are respectively weighed, and the weight of the whole batch of the objects is then divided by the weight of the single one of the objects so as to obtain the number of the objects. However, the accuracy of counting by weighing only ranges between 93% and 95%. Furthermore, in order to weigh the objects, the burden of repeatedly moving the objects is inevitable and causes inconvenience in performing the second approach.

In this way, a more convenient, accurate and cost-saving approach for estimating a number of objects is desired.

SUMMARY

Therefore, an object of the disclosure is to provide a method for estimating a number of objects. The method is to be implemented by a processing module, and is utilized to estimate a number of a plurality of objects having elongated shapes based on an image of the objects that contains substantially-circular end faces of the objects. The method includes the steps of:

generating a characteristic image based on the image of the objects, the characteristic image containing a plurality of characteristic patterns which are associated with the end faces of the objects;

calculating a number of the characteristic patterns based on the characteristic image; and obtaining an estimated number of the objects based on at least the number of the characteristic patterns thus calculated.

An effect of the disclosure resides in that, by virtue of the processing module which generates the characteristic image based on the image of the objects, and calculates the number of the characteristic patterns based on the characteristic image so as to obtain the estimated number of the objects, the objects are neither required to be counted one by one by way of manual counting, nor required to be weighed. Only the processing module is needed to process the image of the objects so as to obtain the estimated number of the objects in an automated and accurate manner.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
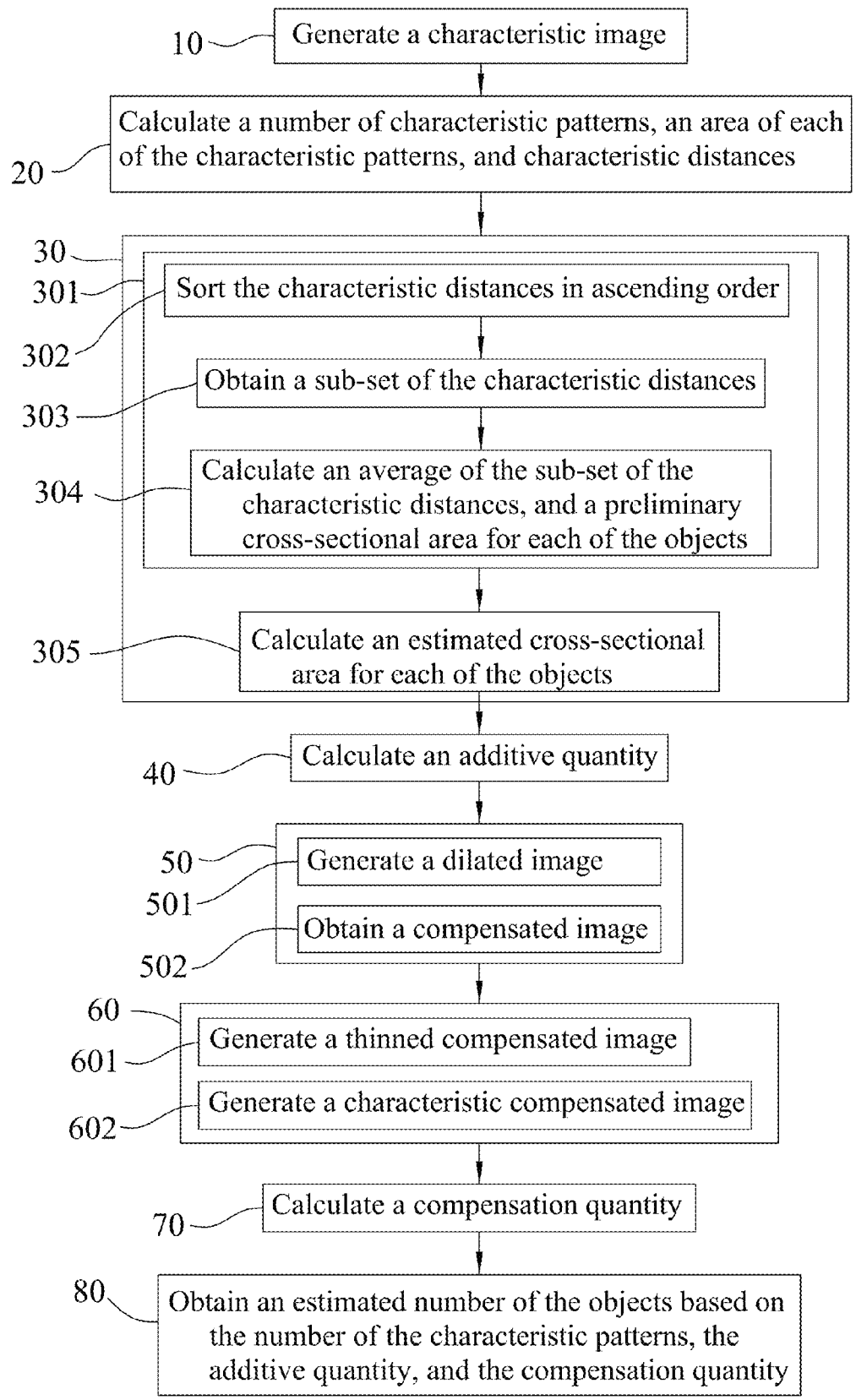
FIG. 1 is a flow chart of an embodiment of the method for estimating a number of objects according to the disclosure which illustrates a procedure to obtain an estimated number of the objects.
Figure 2:
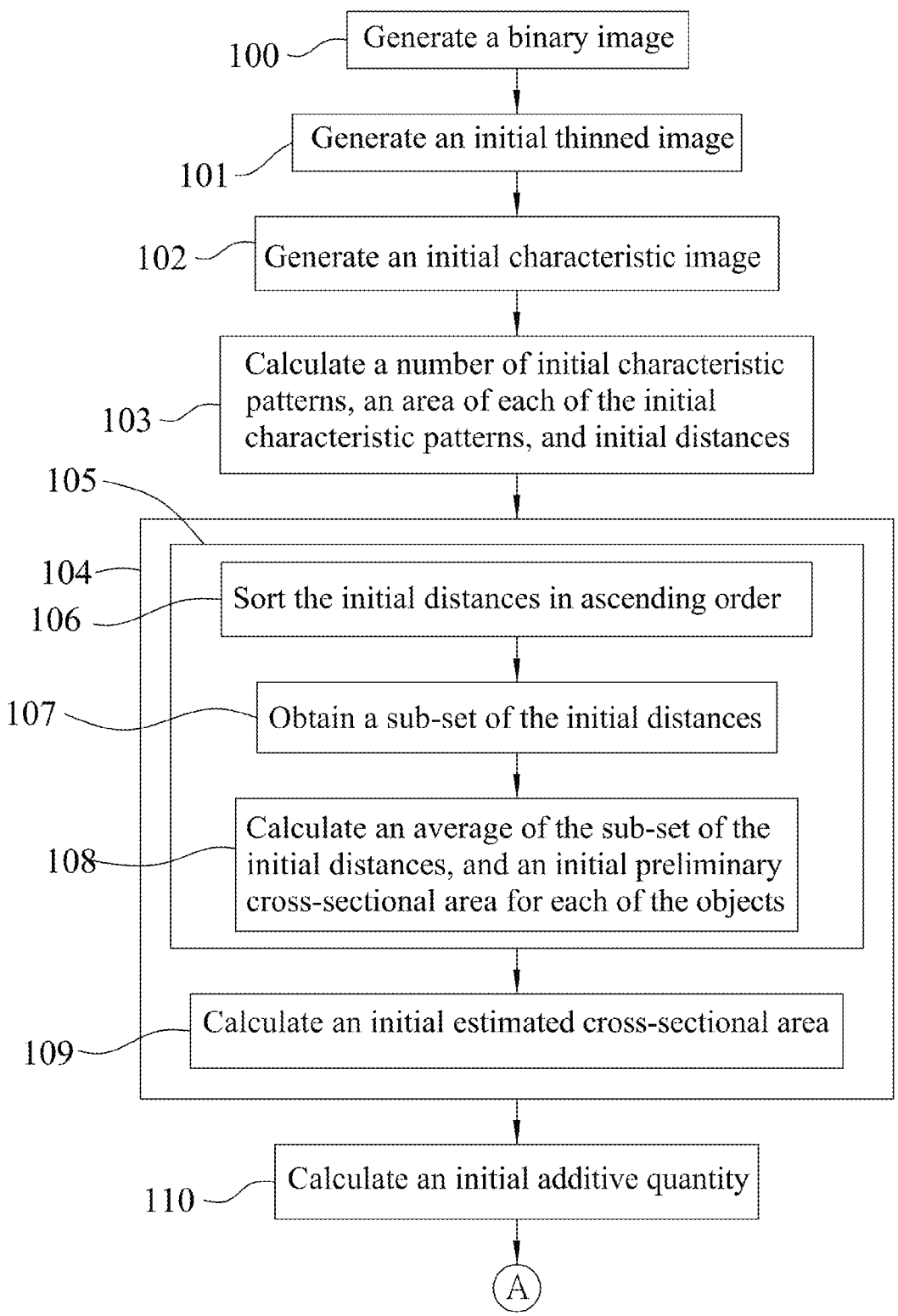
FIG. 2 is a flow chart of the embodiment of the method for estimating a number of objects according to the disclosure which illustrates a procedure to obtain an initial additive quantity.
Figure 3:
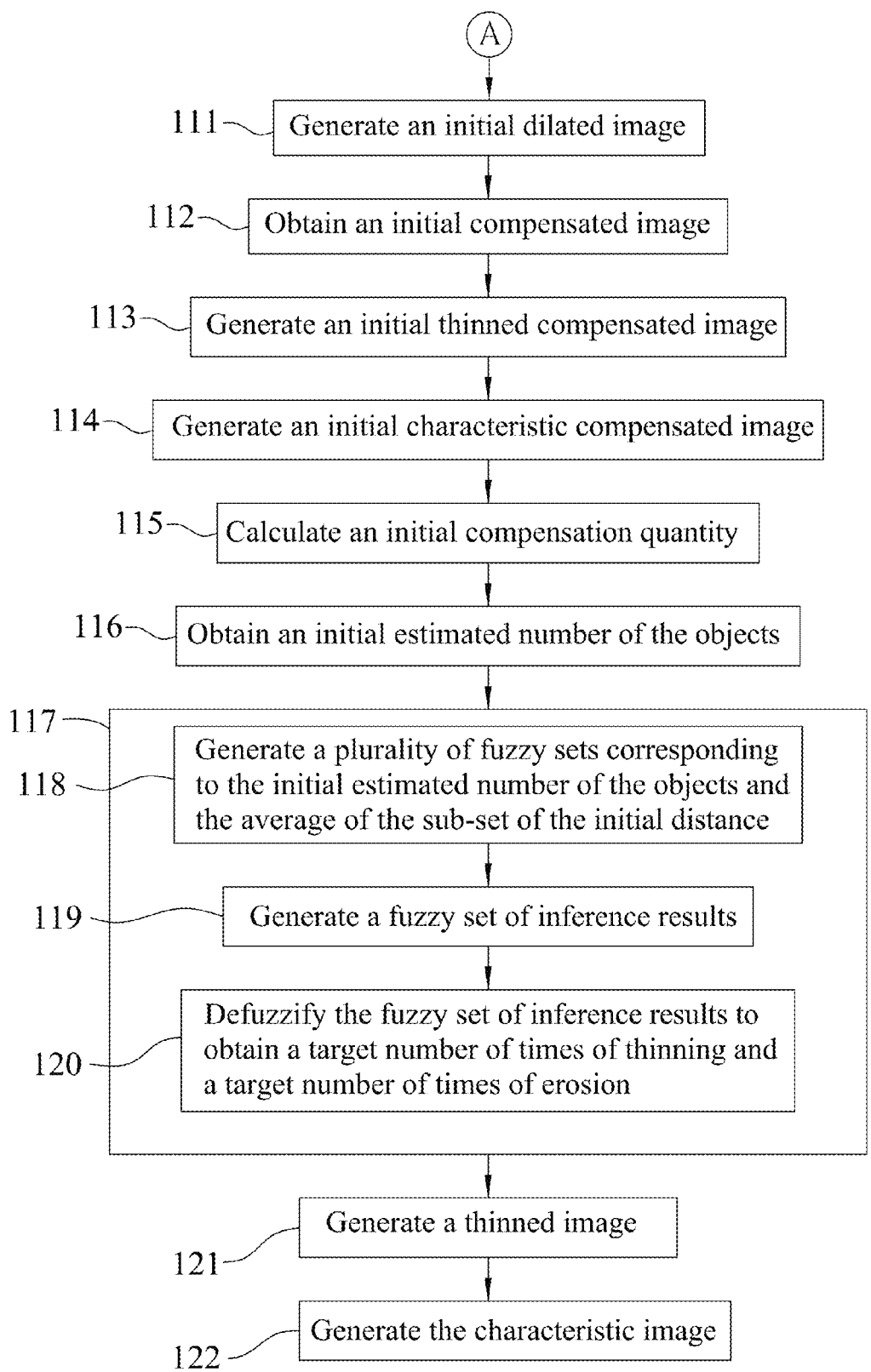
FIG. 3 is a flow chart of the embodiment of the method for estimating a number of objects according to the disclosure which illustrates a procedure to obtain a target number of times of thinning and a target number of times of erosion, and to generate a characteristic image.
Figure 4:
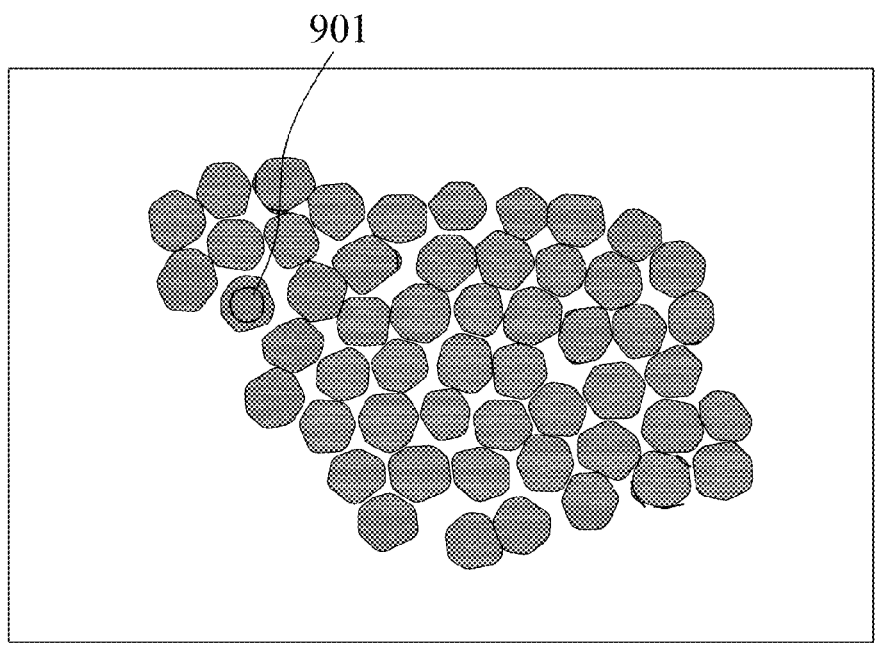
FIG. 4 is a schematic diagram illustrating an image of the objects which is given as an example to explain the method according to the disclosure.

Referring to FIG. 1, FIG. 2 and FIG. 3, an embodiment of a method for estimating a number of objects according to the disclosure is illustrated. The method is adapted to estimate a number of a plurality of objects having elongated shapes, e.g., enforcement steel bars, based on an image of the objects that contains substantially-circular end faces of the objects (see FIG. 4). The method is to be implemented by a processing module (not shown).

In this embodiment, the processing module is a processor which is capable of computing and which is provided in a personal computer or a server. The method for estimating a number of objects according to the disclosure is realized in a manner of computer software, such as a program product for estimating a number of objects, which is to be executed by the processing module for implementing the method for estimating a number of objects of the disclosure.

It is noted that the image of the objects is obtained by way of an image capturing device (not shown) which captures a raw image of the end faces of the objects having elongated shapes. The raw image of the objects contains the substantially-circular end faces of the objects and a background. By utilizing the processing module, the background of the raw image is removed so as to obtain the image of the objects. Specifically, an approach to remove the background contained in the raw image may be realized by a conventional image processing technique of background removal, or a user operational instruction. For example, the substantially-circular end faces of the objects are selected by user operation for subsequent background removal process.

The method for estimating a number of objects according to the disclosure includes the following steps.

Figure 6:
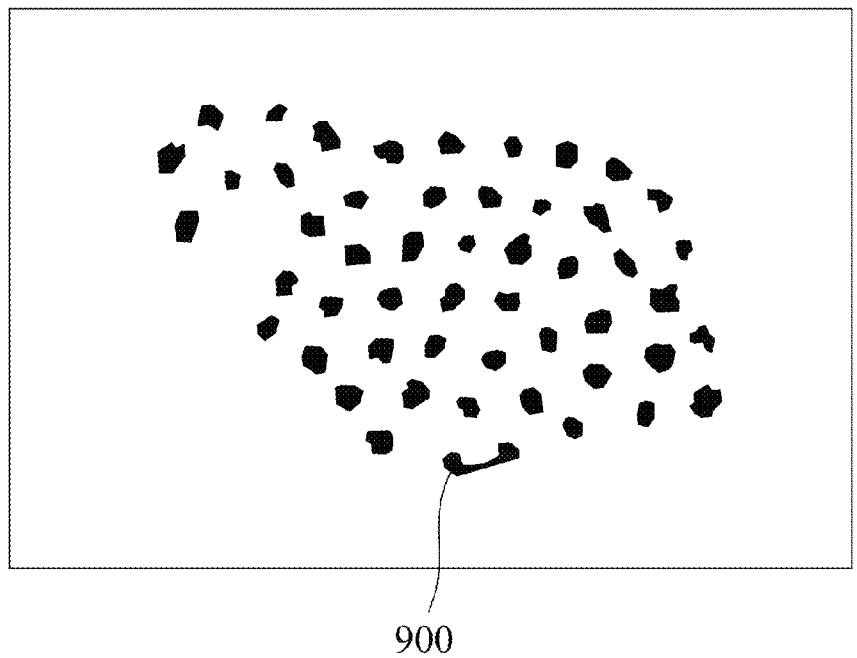
FIG. 6 is a schematic diagram illustrating a characteristic image which is generated in the method according to the disclosure.

In step 10, the processing module is configured to generate a characteristic image (see FIG. 6) based on the image of the objects. The characteristic image contains a plurality of characteristic patterns which are associated with the end faces of the objects.

Specifically, step 10 includes detailed procedure of sub-steps 100 to 121.

Figure 5:
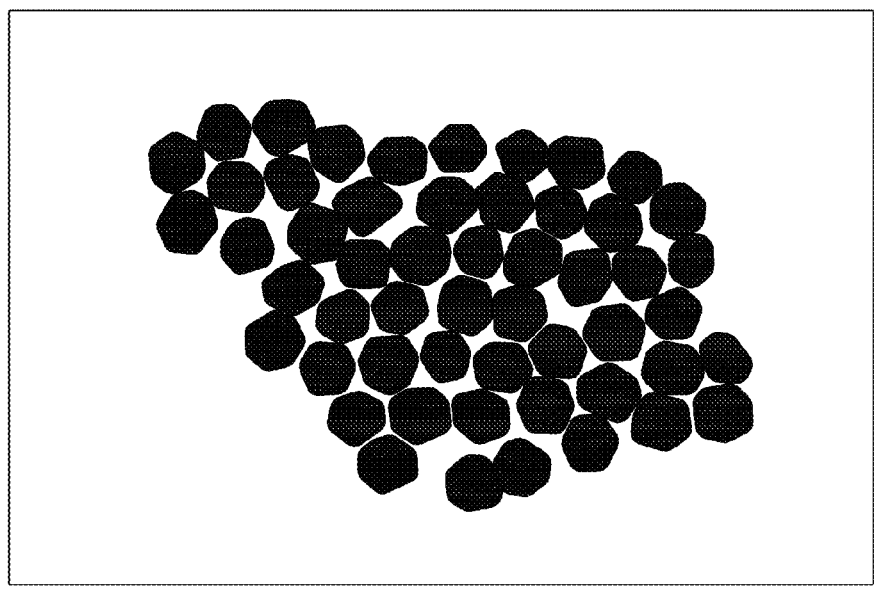
FIG. 5 is a schematic diagram illustrating a binary image which is generated in the method according to the disclosure.

In sub-step 100, the processing module is configured to subject the image of the objects to binary image processing to generate a binary image (see FIG. 5).

In sub-step 101, the processing module is configured to subject the binary image to thinning image processing that involves an initial number of times of thinning to generate an initial thinned image.

In sub-step 102, the processing module is configured to subject the initial thinned image to erosion image processing that involves an initial number of times of erosion to generate an initial characteristic image. The initial characteristic image contains a plurality of initial characteristic patterns which are associated with the end faces of the objects.

In this embodiment the initial number of times of thinning is five, and the initial number of times of erosion is also five. However, in another embodiment of the method of this disclosure, the initial number of times of thinning and the initial number of times of erosion may be adjusted according to different needs, and should not be limited to the numbers revealed herein.

In sub-step 103, the processing module is configured to calculate, based on the initial characteristic image by utilizing the component labeling algorithm, a number of the initial characteristic patterns, an area of each of the initial characteristic patterns, and initial distances each of which is a distance between centers of respective adjacent two of the initial characteristic patterns.

In sub-step 104, the processing module is configured to calculate an initial estimated cross-sectional area for each of the objects based on at least the initial distances.

Specifically, sub-step 104 includes the detailed procedure of sub-steps 105 and 109.

In sub-step 105, the processing module is configured to calculate an average of a sub-set of the initial distances, and to calculate an initial preliminary cross-sectional area for each of the objects based on the average of the sub-set of the initial distances. The initial preliminary cross-sectional area for each of the objects is calculated according to:

$A_{initial\_r} = (\frac{1}{2} d_{initial\_average})^2 \pi$, in which $A_{initial\_r}$ represents the initial preliminary cross-sectional area and $d_{initial\_average}$ represents the average of the sub-set of the initial distances.

Specifically, sub-step 105 further includes the detailed procedure of sub-steps 106 to 108.

In sub-step 106, the processing module is configured to sort the initial distances in ascending order.

In sub-step 107, the processing module is configured to exclude the first 5% and the last 5% of the initial distances sorted in ascending order from the initial distances so as to obtain the sub-set of the initial distances.

In this embodiment, the first 5% and the last 5% are merely adopted for exemplary purposes, should not be taken as limitations of the disclosure herein, and may be adjusted according to different needs.

In sub-step 108, the processing module is configured to calculate the average of the sub-set of the initial distances, and to calculate the initial preliminary cross-sectional area for each of the objects based on the average of the sub-set of the initial distances.

In sub-step 109, the processing module is configured to calculate the initial estimated cross-sectional area for each of the objects based on the initial preliminary cross-sectional area and an initial scaling parameter. The initial scaling parameter is associated with the initial number of times of thinning and the initial number of times of erosion. The initial estimated cross-sectional area is calculated according to:

$A_{initial\_s} = S_{initial} \times A_{initial\_r}$, in which $A_{initial\_s}$ represents the initial estimated cross-sectional area and $S_{initial}$ represents the initial scaling parameter.

After completion of sub-step 104, in sub-step 110, the processing module is configured to calculate an initial additive quantity based on a ratio of the area of each of the initial characteristic patterns calculated in sub-step 103 to the initial estimated cross-sectional area calculated in sub-step 104.

In sub-step 111, the processing module is configured to subject the initial characteristic image to dilation image processing to generate an initial dilated image.

In sub-step 112, the processing module is configured to subtract the initial dilated image from the image of the objects to obtain an initial compensated image.

In sub-step 113, the processing module is configured to subject the initial compensated image to the thinning image processing that involves a preset number of times of thinning to generate an initial thinned compensated image.

In sub-step 114, the processing module is configured to subject the initial thinned compensated image to the erosion image processing that involves a preset number of times of erosion to generate an initial characteristic compensated image.

In this embodiment, the preset number of times of thinning is two, and the preset number of times of erosion is also two. However, in another embodiment of the method of this disclosure, the preset number of times of thinning and the preset number of times of erosion may be adjusted according to different needs, and should not be limited to the numbers revealed herein.

In sub-step 115, the processing module is configured to calculate, based on the initial characteristic compensated image and by utilizing the component labeling algorithm, an initial compensation quantity which is associated with a number of patterns contained in the initial characteristic compensated image.

In sub-step 116, the processing module is configured to obtain an initial estimated number of the objects based on the number of the initial characteristic patterns calculated in sub-step 103, the initial additive quantity calculated in sub-step 110, and the initial compensation quantity calculated in sub-step 115. For example, the initial estimated number of the objects is obtained by calculating a sum of the number of the initial characteristic patterns, the initial additive quantity and the initial compensation quantity.

In sub-step 117, the processing module is configured to infer a target number of times of thinning and a target number of times of erosion from the average of the sub-set of the initial distances calculated in sub-step 105, the initial estimated number of the objects calculated in sub-step 116, a plurality of preset membership functions each of which corresponds to a respective one of the initial estimated number of the objects, the average of the portion of the initial distances, the target number of times of thinning and the target number of times of erosion, and a predetermined rule base.

Specifically, sub-step 117 includes detailed procedure of sub-steps 118 to 120.

In sub-step 118, the processing module is configured to fuzzify the initial estimated number of the objects and the average of the sub-set of the initial distances, based on the initial estimated number of the objects, the average of the sub-set of the initial distances, and the preset membership functions corresponding respectively to the initial estimated number of the objects and the average of the sub-set of the initial distances, so as to generate a plurality of fuzzy sets corresponding to the initial estimated number of the objects and the average of the sub-set of the initial distances.

In sub-step 119, the processing module is configured to generate a fuzzy set of inference results based on the fuzzy sets generated in sub-steps 118, the preset membership functions and the predetermined rule base.

In sub-step 120, the processing module is configured to defuzzify the fuzzy set of inference results to obtain the target number of times of thinning and the target number of times of erosion.

It is noted that, in this embodiment, the inference procedure in sub-steps 118 to 120 is conventional inference procedure associated with fuzzy logic. The predetermined rule base includes four rules which are recited in Table 1 below. The preset membership functions are all triangular membership functions, each of which is associated with a plurality of fuzzy linguistic values and a plurality of fuzzy numbers. Each of Tables 2 to 5 recites the fuzzy linguistic values and the fuzzy numbers corresponding to a respective one of the preset membership functions of the initial estimated number of the objects, the average of the sub-set of the initial distances, the target number of times of thinning and the target number of times of erosion. In another embodiment of this disclosure, the number of the fuzzy linguistic values for each of the preset membership functions may be greater than three, and the fuzzy numbers for each of the preset membership functions may be also adjusted according to different needs. Therefore, the fuzzy linguistic values and the fuzzy numbers should not be limited to the disclosed embodiment herein.

Furthermore, in this embodiment, the processing module obtains the initial estimated number of the objects based on the number of the initial characteristic patterns, the initial additive quantity and the initial compensation quantity. Since the initial estimated number of the objects serves as one of fuzzy input variables to the fuzzy inference process in sub-step 117, according to inference characteristics of fuzzy theory, the fuzzy input variables for inference may have fuzziness and are not required to be very precise. Therefore, in another embodiment of this disclosure, the processing module may obtain the initial estimated amount of objects merely based on the amount of the initial characteristic patterns and the initial additive quantity, merely based on the amount of the amount of the initial characteristic patterns and the initial compensation quantity, or based on the number of the initial characteristic patterns solely. In this way, a portion of the sub-steps may be omitted, such as omitting a partial calculation process of sub-step 103, sub-step 104, sub-step 110, sub-step 111, sub-step 112, sub-step 113, sub-step 114 and sub-step 115, so as to reduce computational load of the processing module and to promote efficiency of the method for estimating a number of objects of the disclosure.

TABLE 1

| | |
|---|---|
| First rule | If the initial estimated number of the objects is great and the average of the sub-set of the initial distances is small, then the target number of times of thinning is small and the target number of times of erosion is small |
| Second rule | If the initial estimated number of the objects is great and the average of the sub-set of the initial distances is large, then the target number of times of thinning is medium and the target number of times of erosion is medium |
| Third rule | If the initial estimated number of the objects is small and the average of the sub-set of the initial distances is small, then the target number of times of thinning is small and the target number of times of erosion is small |
| Fourth rule | If the initial estimated number of the objects is small and the average of the sub-set of the initial distances is large, then the target number of times of thinning is great and the target number of times of erosion is great |

TABLE 2

Preset membership function corresponding to the initial estimated number of the objects

| Fuzzy linguistic value | Fuzzy number |
|---|---|
| Small | (0, 30) |
| Great | (20, 50) |

TABLE 3

Preset membership function corresponding to the average of the sub-set of the initial distances

| Fuzzy linguistic value | Fuzzy number |
|---|---|
| Small | (0, 60) |
| Large | (50, 100) |

TABLE 4

Preset membership function corresponding to the target number of times of thinning

| Fuzzy linguistic value | Fuzzy number |
|---|---|
| Small | (0, 3, 5) |
| Medium | (3, 5, 7) |
| Great | (5, 7, 7) |

TABLE 5

Preset membership function corresponding to the target number of times of erosion

| Fuzzy linguistic value | Fuzzy number |
|---|---|
| Small | (0, 3, 6) |
| Medium | (3, 6, 9) |
| Great | (6, 9, 9) |

In sub-step 121, the processing module is configured to subject the binary image to the thinning image processing that involves the target number of times of thinning to generate a thinned image.

In sub-step 122, the processing module is configured to subject the thinned image to the erosion image processing that involves the target number of times of erosion to generate the characteristic image.

In step 20, the processing module is configured to calculate, based on the characteristic image and by utilizing the component labeling algorithm, a number of the characteristic patterns, an area of each of the characteristic patterns, and characteristic distances each of which is a distance between centers of respective adjacent two of the characteristic patterns.

In step 30, the processing module is configured to calculate an estimated cross-sectional area for each of the objects based on at least the characteristic distances.

Specifically, step 30 includes the detailed procedure of sub-steps 301 and 305.

In sub-step 301, the processing module is configured to calculate an average of a sub-set of the characteristic distances, and to calculate a preliminary cross-sectional area for each of the objects based on the average of the sub-set of the characteristic distances. The preliminary cross-sectional area for each of the objects is calculated according to:

$A_r = (½d_{average})^2 \pi$, in which $A_r$ represents the preliminary cross-sectional area and $d_{average}$ represents the average of the sub-set of the characteristic distances.

Specifically, sub-step 301 further includes the detailed procedure of sub-steps 302 to 304.

In sub-step 302, the processing module is configured to sort the characteristic distances in ascending order.

In sub-step 303, the processing module is configured to exclude the first 5% and the last 5% of the characteristic distances sorted in ascending order from the characteristic distances so as to obtain the sub-set of the characteristic distances.

In this embodiment, the first 5% and the last 5% are merely adopted for exemplary purposes, should not be taken as limitations of the disclosure herein, and may be adjusted according to different needs.

In sub-step 304, the processing module is configured to calculate the average of the sub-set of the characteristic distances, and to calculate the preliminary cross-sectional area for each of the objects based on the average of the sub-set of the characteristic distances.

In sub-step 305, the processing module is configured to calculate the estimated cross-sectional area for each of the objects based on the preliminary cross-sectional area and a preset scaling parameter. The preset scaling parameter is associated with the target number of times of thinning and the target number of times of erosion. The estimated cross-sectional area is calculated according to:

$A_s = S \times A_r$, in which $A_s$ represents the estimated cross-sectional area and S represents the preset scaling parameter.

In step 40, the processing module is configured to calculate an additive quantity based on a ratio of the area of each of the characteristic patterns calculated in step 20 to the estimated cross-sectional area calculated in step 30.

It is noted that the characteristic image (see FIG. 6) generated in sub-step 122 contains a characteristic pattern 900 which corresponds to two of the end faces of the objects. Since the processing module is not able to appropriately divide the characteristic pattern 900 into two separate characteristic patterns during performances of the thinning image processing and the erosion image process, this characteristic pattern 900 is taken as a single characteristic pattern 900 by the processing module in step 20. However, since the characteristic pattern 900 in fact corresponds to two of the objects, the additive quantity should be considered for the characteristic pattern 900 while estimating the number of the objects. By virtue of calculating a ratio of an area of the characteristic pattern 900 to the estimated cross-sectional area, the additive quantity may be obtained based on the ratio. For example, if the ratio of the area of the characteristic pattern 900 to the estimated cross-sectional area is 2.01, the additive quantity would be one.

Figure 7:
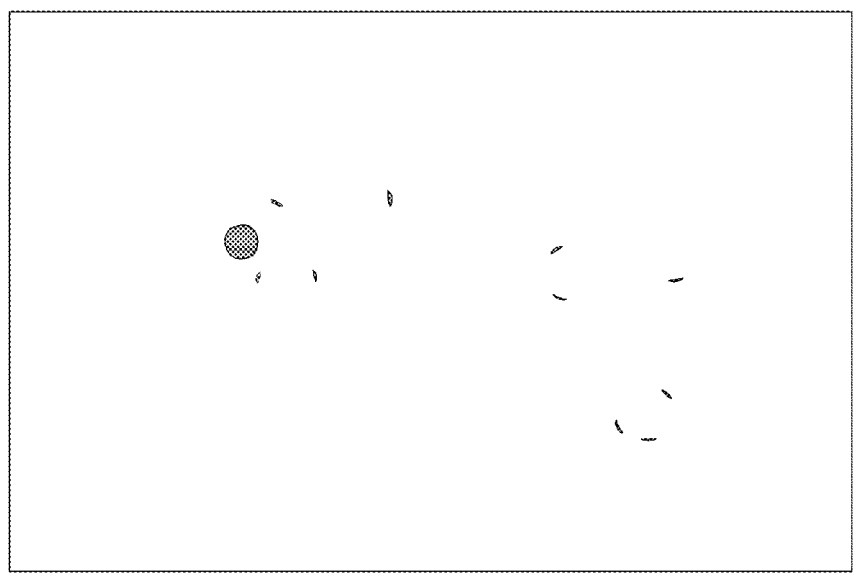
FIG. 7 is a schematic diagram illustrating a compensated image which is generated in the method according to the disclosure.

In step 50, the processing module is configured to obtain a compensated image (see FIG. 7) based on the image of the objects and the characteristic image.

Specifically, step 50 includes the detailed procedure of sub-steps 501 and 502.

In sub-step 501, the processing module is configured to subject the characteristic image to the dilation image processing to generate a dilated image.

In sub-step 502, the processing module is configured to subtract the dilated image from the image of the objects to obtain the compensated image.

In step 60, the processing module is configured to generate a characteristic compensated image based on the compensated image.

Specifically, step 60 includes the detailed procedure of sub-steps 601 and 602.

In sub-step 601, the processing module is configured to subject the characteristic compensated image to the thinning image processing that involves the preset number of times of thinning to generate a thinned compensated image.

In sub-step 602, the processing module is configured to subject the thinned compensated image to the erosion image processing that involves the pre set number of times of erosion to generate the characteristic compensated image.

In step 70, the processing module is configured to calculate, based on the characteristic compensated image and by utilizing the component labeling algorithm, a compensation quantity which is associated with a number of patterns contained in the characteristic compensated image.

It is noted that since a portion of object patterns contained in the image of the objects (such as the object pattern 901 in FIG. 4) might be excessively thinned and eroded by the processing module during performances of the thinning image processing and the erosion image processing, a characteristic pattern corresponding to the object pattern 901 might not exist in the characteristic image, such that the object corresponding to the object pattern 901 is not counted while the processing module is calculating the number of the characteristic patterns contained in the characteristic image. In this way, the number of the objects should be compensated with respect to the object pattern 901. By virtue of generating the compensated image (see FIG. 7), and generating the characteristic compensated image based on the compensated image, the compensation quantity can be calculated based on the characteristic compensated image.

In step 80, the processing module is configured to obtain an estimated number of the objects based on the number of the characteristic patterns calculated in step 20, the additive quantity calculated in step 40, and the compensation quantity calculated in step 70. For example, the estimated number of the objects is obtained by calculating a sum of the number of the characteristic patterns, the additive quantity and the compensation quantity.

To sum up, by virtue of the processing module which generates the characteristic image based on the image of the objects, and calculates the number of the characteristic patterns based on the characteristic image, the estimated number of the objects may be obtained. The estimated number of the objects obtained by the method for estimating a number of objects of this disclosure has an accuracy of 99.5%, and can be obtained solely through the processing module which performs processing and computation upon the image of the objects, so as to achieve the effects of convenience, accuracy and cost saving.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A method for estimating a number of objects, the method to be implemented by a processing module, and being utilized to estimate a number of a plurality of objects having elongated shapes based on an image of the objects that contains substantially-circular end faces of the objects, the method comprising the steps of:
    generating a characteristic image based on the image of the objects, the characteristic image containing a plurality of characteristic patterns which are associated with the end faces of the objects;
    calculating, based on the characteristic image, a number of the characteristic patterns, an area of each of the characteristic patterns, and characteristic distances each of which is a distance between centers of respective adjacent two of the characteristic patterns
    calculating an estimated cross-sectional area for each of the objects based on at least the characteristic distances;
    calculating an additive quantity based on a ratio of the area of each of the characteristic patterns to the estimated cross-sectional area; and
    obtaining an estimated number of the objects based on at least the number of the characteristic patterns thus calculated and the additive quantity.

2. The method of claim 1, wherein the step of calculating a number of the characteristic patterns further includes calculating, based on the characteristic image by utilizing the component labeling algorithm, the number of the characteristic patterns, the area of each of the characteristic patterns, and the characteristic distances each of which is the distance between centers of respective adjacent two of the characteristic patterns.

3. The method of claim 1, prior to the step of obtaining an estimated number of the objects, further comprising:
    obtaining a compensated image based on the image of the objects and the characteristic image;
    generating a characteristic compensated image based on the compensated image; and
    calculating a compensation quantity based on the characteristic compensated image; and
    wherein the step of obtaining an estimated number of the objects further includes obtaining the estimated number of the objects based on the number of the characteristic patterns, the additive quantity and the compensation quantity.

4. The method of claim 3, wherein the step of obtaining a compensated image includes the sub-step of:
    subjecting the characteristic image to dilation image processing to generate a dilated image; and
    subtracting the dilated image from the image of the objects to obtain the compensated image.

5. The method of claim 1, wherein the step of generating a characteristic image includes the sub-steps of:
    subjecting the image of the objects to binary image processing to generate a binary image;
    subjecting the binary image to thinning image processing that involves a target number of times of thinning to generate a thinned image; and
    subjecting the thinned image to erosion image processing that involves a target number of times of erosion to generate the characteristic image.

6. The method of claim 5, wherein the step of calculating an estimated cross-sectional area for each of the objects includes the sub-step of:
    calculating an average of a sub-set of the characteristic distances;
    calculating a preliminary cross-sectional area for each of the objects based on the average of the sub-set of the characteristic distances, wherein the preliminary cross-sectional area for each of the objects is calculated according to
    $A_r=(\frac{1}{2}d_{average})^2\pi$, in which $A_r$ represents the preliminary cross-sectional area and $d_{average}$ represents the average of the sub-set of the characteristic distances; and
    calculating the estimated cross-sectional area for each of the objects based on the preliminary cross-sectional area and a preset scaling parameter, the preset scaling parameter being associated with the target number of times of thinning and the target number of times of erosion.

7. The method of claim 6, wherein the sub-step of calculating the estimated cross-sectional area for each of the objects includes calculating the estimated cross-sectional area according to:
    $A_s=S\times A_r$, in which $A_s$ represents the estimated cross-sectional area and S represents the preset scaling parameter.

8. The method of claim 5, wherein the step of generating a characteristic image further includes, between the sub-step of subjecting the image of the objects to binary image processing and the sub-step of subjecting the binary image to thinning image processing, the sub-steps of:
    subjecting the binary image to the thinning image processing that involves an initial number of times of thinning to generate an initial thinned image;
    subjecting the initial thinned image to the erosion image processing that involves an initial number of times of erosion to generate an initial characteristic image, the initial characteristic image containing a plurality of initial characteristic patterns which are associated with the end faces of the objects;
    calculating, based on the initial characteristic image, a number of the initial characteristic patterns, an area of each of the initial characteristic patterns, and initial distances each of which is a distance between centers of respective adjacent two of the initial characteristic patterns;
    calculating an initial estimated cross-sectional area for each of the objects based on at least the initial distances;
    calculating an initial additive quantity based on a ratio of the area of each of the initial characteristic patterns to the initial estimated cross-sectional area;
    obtaining an initial estimated number of the objects based on the number of the initial characteristic patterns and the initial additive quantity; and inferring the target number of times of thinning and the target number of times of erosion from
an average of a sub-set of the initial distances,
the initial estimated number of the objects,
a plurality of preset membership functions each of which corresponds to a respective one of the initial estimated number of the objects, the average of the sub-set of the initial distances, the target number of times of thinning and the target number of times of erosion, and
a predetermined rule base.

9. The method of claim 8, wherein the rule base includes:

a first rule that if the initial estimated number of the objects is great and the average of the sub-set of the initial distances is small, then the target number of times of thinning is small and the target number of times of erosion is small;

a second rule that if the initial estimated number of the objects is great and the average of the sub-set of the initial distances is large, then the target number of times of thinning is medium and the target number of times of erosion is medium;

a third rule that if the initial estimated number of the objects is small and the average of the sub-set of the initial distances is small, then the target number of times of thinning is small and the target number of times of erosion is small; and a fourth rule that if the initial estimated number of the objects is small and the average of the sub-set of the initial distances is large, then the target number of times of thinning is great and the target number of times of erosion is great.

* * * * *